(12) United States Patent
Lane (10) Patent No.: US 7,369,121 B2
(45) Date of Patent: May 6, 2008

(54) INPUT DEVICE WITH A ZOOM APPARATUS

(75) Inventor: David Michael Lane, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 10/896,433

(22) Filed: Jul. 21, 2004

(65) Prior Publication Data

US 2006/0017696 A1   Jan. 26, 2006

(51) Int. Cl.
*G06F 3/02* (2006.01)
(52) U.S. Cl. .................. 345/168; 345/174; 341/34
(58) Field of Classification Search ................ 345/161, 345/156, 168, 163, 164, 184, 169, 174, 660, 345/662; 708/142; 341/21, 22, 34; 200/5 R
See application file for complete search history.

(56) References Cited

U.S. PATENT DOCUMENTS

| 4,825,157 | A | * | 4/1989 | Mikan ..................... 324/207.2 |
|---|---|---|---|---|
| 5,604,509 | A | | 2/1997 | Moore et al. |
| 6,281,881 | B1 | | 8/2001 | Siddiqui et al. |
| 6,323,445 | B1 | * | 11/2001 | Yee ............................. 200/5 A |
| 6,509,847 | B1 | * | 1/2003 | Anderson .................... 341/34 |
| 6,686,904 | B1 | | 2/2004 | Sherman et al. |
| 6,762,749 | B1 | | 7/2004 | Gouzman et al. |
| 2003/0043123 | A1 | * | 3/2003 | Hinckley et al. ........... 345/173 |
| 2003/0107547 | A1 | * | 6/2003 | Kehlstadt et al. ........... 345/156 |
| 2004/0119693 | A1 | * | 6/2004 | Kaemmler .................. 345/163 |

* cited by examiner

*Primary Examiner*—Amr A. Awad
*Assistant Examiner*—Dennis P Joseph
(74) *Attorney, Agent, or Firm*—Birch, Stewart, Kolasch & Birch, LLP (57) ABSTRACT

An input is disclosed that includes a zoom apparatus for increasing or decreasing the size of an image rendered on a display screen. The zoom apparatus has an actuator that is movable in a first direction to induce the image to zoom in. The actuator is also movable in a second direction to induce the image to zoom out. The zoom apparatus may include a sensor for detecting movement of the actuator in the first direction and movement of the actuator in the second direction. The input device may be a keyboard, for example, that includes a plurality of keys for inputting alphanumeric data, with the sensor also detecting actuation of the keys.

23 Claims, 10 Drawing Sheets

INPUT DEVICE WITH A ZOOM APPARATUS

BACKGROUND OF THE INVENTION

1. Field of the Invention

The present invention relates to input devices for computer operating environments. The invention concerns, more particularly, an input device that incorporates a zoom apparatus for increasing or decreasing the size of an image rendered on a display screen. Concepts related to the input device and zoom apparatus have application to a variety of input devices, including a keyboard.

2. Description of Background Art

A variety of data entry techniques have been developed to enhance usability and to make computers more versatile throughout the evolution of the field of computer science. For example, a typical computer system, especially a computer system using graphical user interfaces for user interaction, may be optimized for accepting input from one or more discrete input devices. Thus, an individual may enter text with a keyboard, and control the position of a pointer image on a display screen with a pointing device, such as a mouse, having one or more buttons for activating selections associated with the location of the pointer. Some computing systems even include a pen-like stylus.

The viewable contents of a computer file, such as a text document, spreadsheet, digital photograph, Web page, or other image rendered on a conventional display screen, may possess a size exceeding the viewable boundaries of the display screen. In other words, the display screen may only render a portion of the viewable contents of the computer file. Similarly, the viewable contents of a computer file may be rendered at a resolution that is less than the resolution of the computer file, thereby limiting the degree to which an individual may view details of the computer file. To address this issue, many operating systems or other software applications permit individuals to selectively modify the relative size of the viewable contents of the computer file, as rendered on the display screen. That is, many conventional computer operating environments incorporate a zoom feature that resizes the viewable contents of the computer file that are rendered on the display screen.

As utilized in the present document, the term "zoom" is intended to denote a change in the scale (i.e., relative size) at which the viewable contents of the computer file are rendered on the display screen. Accordingly, the zoom feature of conventional computer operating environments permits an individual to selectively modify the relative size of the viewable contents of the computer file. For example, the individual may "zoom in" on the viewable contents of the computer file in order to increase the relative size of the rendered image. Given the size constraints of the display screen, zooming in may decrease the percentage of the viewable contents of the computer file that are rendered on the display screen. Similarly, the individual may "zoom out" on the viewable contents in order to decrease the relative size of the rendered image. Based upon the resolution constraints of the display screen, zooming out may decrease the resolution of the viewable contents of the computer file that are rendered on the display screen, thereby limiting detail in the rendered image.

One conventional manner of incorporating a zoom feature into a conventional computer operating environment involves the use of a pointing device, such as a mouse, to navigate through menus that are rendered on the display screen. In many circumstances, multiple movements of the pointing device and actuations of buttons for activating selections associated with zooming are required in order to utilize the zoom feature. Accordingly, the various steps necessary for utilizing conventional zoom features may be relatively inefficient.

SUMMARY OF THE INVENTION

One aspect of the invention involves an input device that includes a zoom apparatus for zooming an image rendered on a display screen. The zoom apparatus includes an actuator that translates in a first direction to induce the image to zoom in. In addition, the actuator is translatable in a second direction to induce the image to zoom out.

Another aspect of the present invention involves an input device that may exhibit the configuration of a keyboard, for example. The input device includes a plurality of keys for inputting alphanumeric data, a zoom apparatus, and a sensing arrangement. The zoom apparatus zooms an image rendered on a display screen. The zoom apparatus includes an actuator that translates in a first direction to induce the image to zoom in, and the actuator is translatable in a second direction to induce the image to zoom out. The sensing arrangement detects movement of the actuator in the first direction and movement of the actuator in the second direction, and the sensing arrangement also detects actuation of the keys.

A further aspect of the invention involves a method of zooming an image rendered on a display screen. The method includes providing an input device with a dedicated zoom apparatus having a movable actuator. Movement of the actuator to a first position is detected, and a first signal is transmitted to a host computer that is operatively connected to the display screen to induce the image to zoom in. In addition, movement of the actuator to a second position is detected, and a second signal is transmitted to the host computer to induce the image to zoom out.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose an input device in accordance with the present invention. The input device incorporates a zoom apparatus that may be utilized by an individual to selectively change the scale (i.e., relative size) at which viewable contents of a computer file are rendered on a display screen as an image. Accordingly, the zoom apparatus permits the individual to zoom in or zoom out on the viewable contents of the computer file in order to increase or decrease the relative size of the rendered image.

Figure 1:
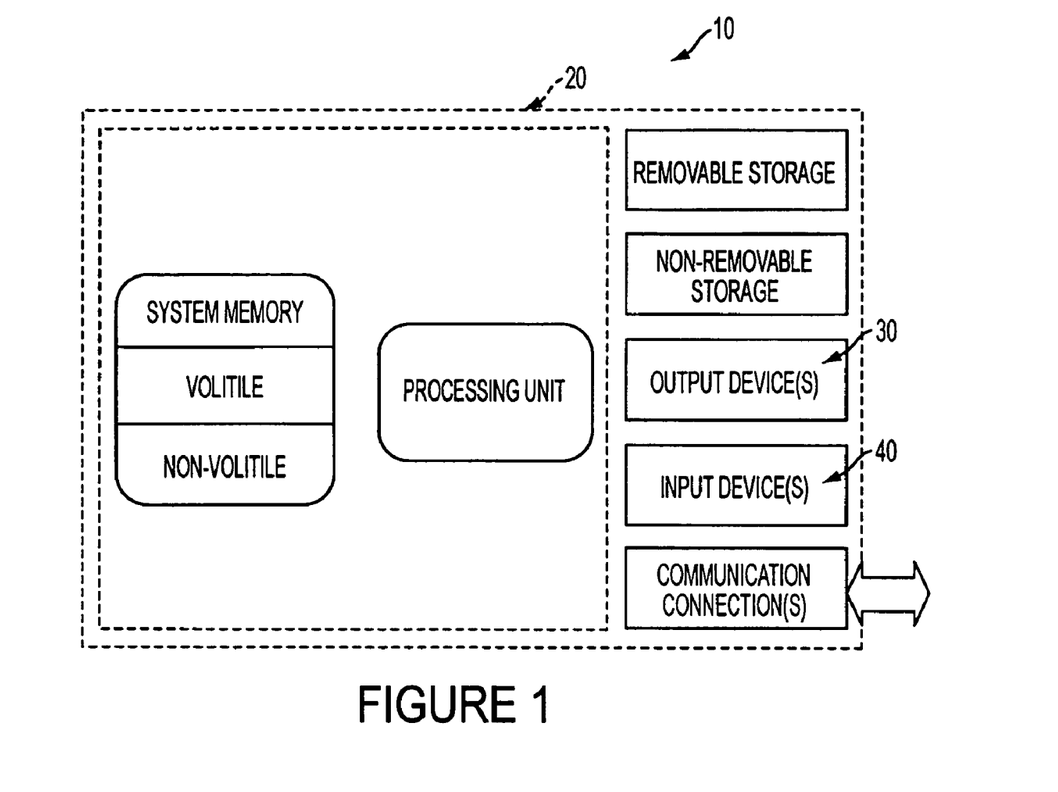
FIG. 1 is a schematic view of an exemplary operating environment.
Figure 2:
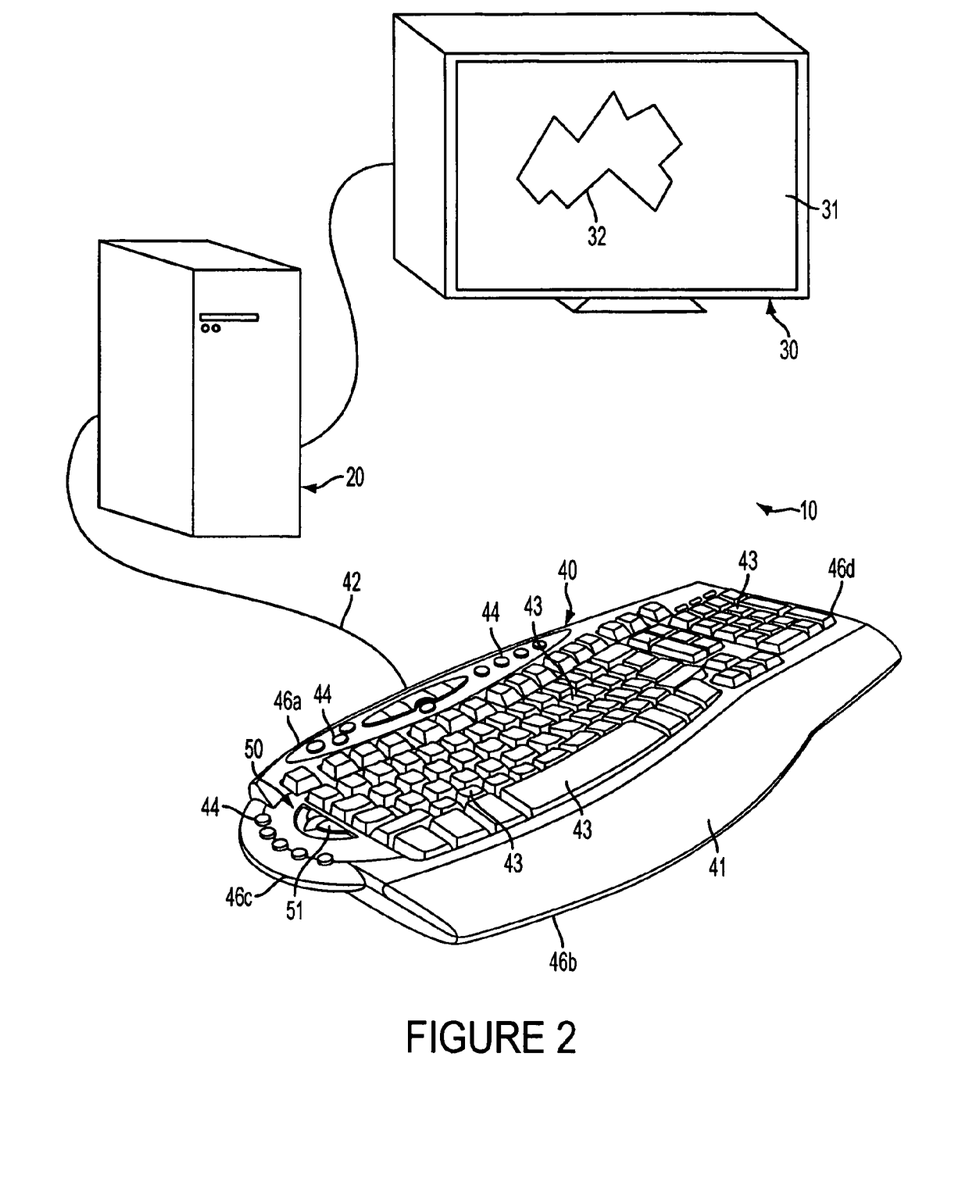
FIG. 2 is an perspective view of the exemplary operating environment, that depicts a host computer, an output device, and an input device.
Figure 3:
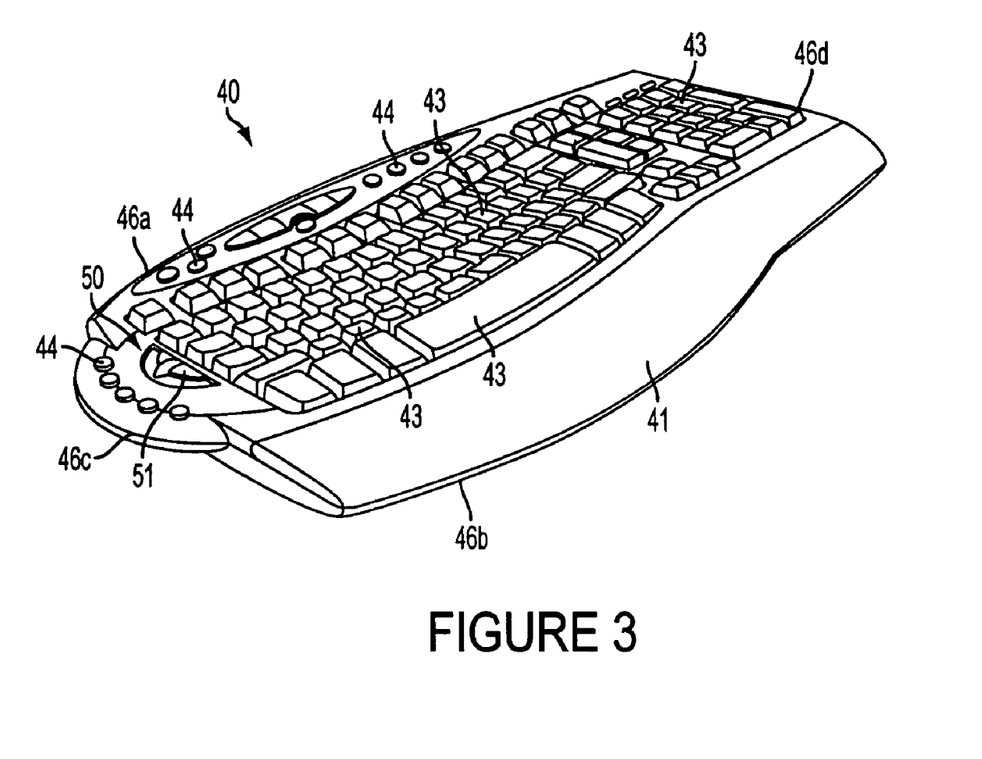
FIG. 3 is a perspective view of the input device.

As will be appreciated by those of ordinary skill in the art, the input device may be utilized in connection with a computer operating environment. That is, the signals transmitted by the input device may be governed by computer-executable instructions, such as program modules, executed by one or more computing devices. It may be helpful, therefore, to briefly discuss the components and operation of a typical operating environment on which various embodiments of the invention may be employed. FIGS. 1 and 2 illustrate examples of the operating environment 10, in which various embodiments of the invention may be implemented. The operating environment 10 is only one example of a suitable operating environment, however, and is not intended to suggest any limitation as to the scope of use or functionality of the invention. Other well known operating environments or configurations that may be suitable for use with the invention include, but are not limited to server computers, hand-held or laptop devices, multiprocessor systems, microprocessor-based systems, programmable consumer electronics, network PCs, minicomputers, mainframe computers, distributed computing environments that include any of the above systems or devices, and the like.

The operating environment 10 includes the host computer 20 that is operatively connected to the output device 30, such as a computer monitor, and the input device 40, which may be a keyboard, for example. One skilled in the relevant art will recognize that one or more data files may be processed by the host computer 20 and a signal may be transmitted to the output device 30, thereby directing the output device 30 to render the image 32 on the display screen 31. The input device 40 is utilized in connection with the host computer 20 to enter data, which may take the form of a plurality of characters, as described in greater detail below.

The host computer 20 typically includes at least some form of computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information.

In its most basic configuration, the host computer 20 typically includes a processing unit and system memory. Depending on the exact configuration and type of the host computer 20, the system memory may include volatile memory (such as RAM), non-volatile memory (such as ROM, flash memory, etc.), or some combination of the two memory types. Additionally, the host computer 20 may also have mass storage devices, such as a removable storage device, a non-removable storage device, or some combination of two storage device types. The mass storage devices can be any device that can retrieve stored information, such as magnetic or optical disks or tape, punched media, or holographic storage. As will be appreciated by those of ordinary skill in the art, the system memory and mass storage devices are examples of computer storage media.

The operating environment 10 may also have one or more additional input devices that are operatively connected to the host computer 20, such as a pointing device, microphone, or scanner, for receiving input from an individual. Furthermore the operating environment 10 may have one or more additional output devices operatively connected to the host computer 20, such as a speaker, printer, or a tactile feedback device, for outputting data to an individual. Other components of the operating environment 10 may include communication connections to other devices, computers, networks, servers, etc. using either wired or wireless connections. All of these devices and connections are well know in the art and thus will not be discussed at length here.

The input device 40 is discussed herein and depicted in the figures as a keyboard. The housing 41 forms an exterior of the input device 40, and the cord 42 extends from the housing 41 in order to transmit signals from the input device 40 to the host computer 20 through a USB connection or other suitable wired connection. Alternately, a conventional wireless connection between the input device 40 and the host computer 20 may also be utilized, as is well-known in the art. The signals that are transmitted by the cord 42 are typically generated in response to manipulation of one of the plurality of keys 43, buttons 44, or other input elements that are associated with a membrane sensor system 45 located within the housing 41. Furthermore, the signals may be generated by the zoom apparatus 50 that is dedicated to zooming of the image 32 on the display screen 31. That is, the zoom apparatus 50 may be solely usable in order to induce zooming of the image 32 in some embodiments of the invention.

Figure 5:
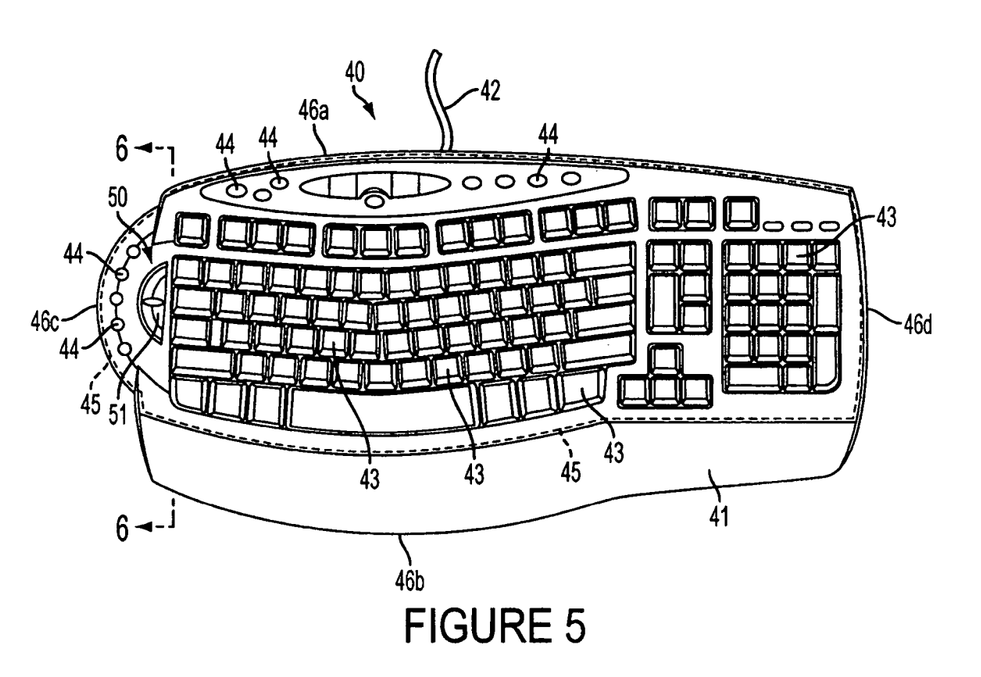
FIG. 5 is a top plan view of the input device.

The keys 43 of the input device 40 may be utilized, for example, to input alphanumeric data and are generally arranged in the configuration of a conventional QWERTY keyboard, but may alternatively have the configuration of a AZERTY keyboard or any other desirable keyboard configuration. A portion of the buttons 44 is positioned laterally across a top portion of the input device 40, and additional buttons 44 may be positioned adjacent the zoom apparatus 50. Suitable uses for the buttons 44 include launching pre-designated software applications, adjusting the volume or intensity of an output device, such as a speaker, modifying power levels of the host computer 20, or providing basic controls for a media player, for example. When the keys 43 and the buttons 44 are depressed or otherwise actuated, the membrane sensor system 45 detects or otherwise senses the actuations and transmits a signal to the host computer 20. Accordingly, the membrane sensor system 45 may extend under all of the keys 43, the buttons 44, and the zoom apparatus 50, as depicted in FIG. 5. The membrane sensor system 45 may exhibit a conventional structure, as disclosed in U.S. Pat. No. 6,323,445 to Yee.

In addition to the features of existing keyboards (i.e., the various elements 41-45), the input device 40 also includes the zoom apparatus 50, as depicted in FIGS. 2-6. The zoom apparatus 50 may be utilized by the individual to selectively change the scale (i.e., relative size) at which the image 32 is rendered on the display screen 31. Accordingly, the zoom apparatus 50 permits the individual to zoom in or zoom out on the image 32 in order to increase or decrease the relative size of the image 32. More particularly, moving the zoom apparatus 50 in a first direction may be utilized to zoom in on the image 32, thereby increasing the relative size of the image 32. Given the size constraints of the display screen 31, zooming in may decrease the percentage of the image 32 that is rendered on the display screen 31. Similarly, moving the zoom apparatus 50 in a second direction may be utilized to zoom out on the image 32, thereby decreasing the relative size of the image 32. Given the resolution constraints of the display screen 31, zooming out may decrease the resolution of the image 32 and limit detail in the image 32.

The zoom apparatus 50 is dedicated to the function of zooming the image 32 on the display screen 31. In some embodiments, therefore, the only function of the zoom apparatus 50 is to selectively change the scale (i.e., relative size) at which the image 32 is rendered on the display screen 31. In other embodiments of the invention, however, the function of the zoom apparatus 50 may be modified, through a software interface, for example, to control other features of the operating environment 10.

For purposes of reference, the input device 40 includes a rear edge 46a, a forward edge 46b, a left edge 46c, and a right edge 46d. As depicted in FIGS. 2-5, the zoom apparatus 50 is positioned adjacent a left portion of the keys 43 and also adjacent the left edge 46c. Within the scope of the present invention, the zoom apparatus 50 may be positioned in any other portion of the input device 40. An advantage to placing the zoom apparatus 50 adjacent the left portion of the keys 43 relates to accessibility. The keys 43 are a frequently utilized portion of the input device 40. Accordingly, the hands of the individual are often positioned over the keys 43 when utilizing the input device 40. By placing the zoom apparatus 50 adjacent the left portion of the keys 43, the zoom apparatus 50 is accessible to the individual and can be manipulated by the individual with finger movements during alphanumeric entry and with little or no displacement of the wrist and arms.

The structure of the zoom apparatus 50 will now be discussed. In general, the zoom apparatus 50 includes an engagement portion, a sensing arrangement, and a biasing system. The engagement portion provides an area for the individual to operate the zoom apparatus 50. The sensing arrangement detects movement or manipulation, for example, of the engagement portion. In addition, the biasing system returns the engagement portion to a neutral position following movement or manipulation of the engagement portion.

Figure 4:
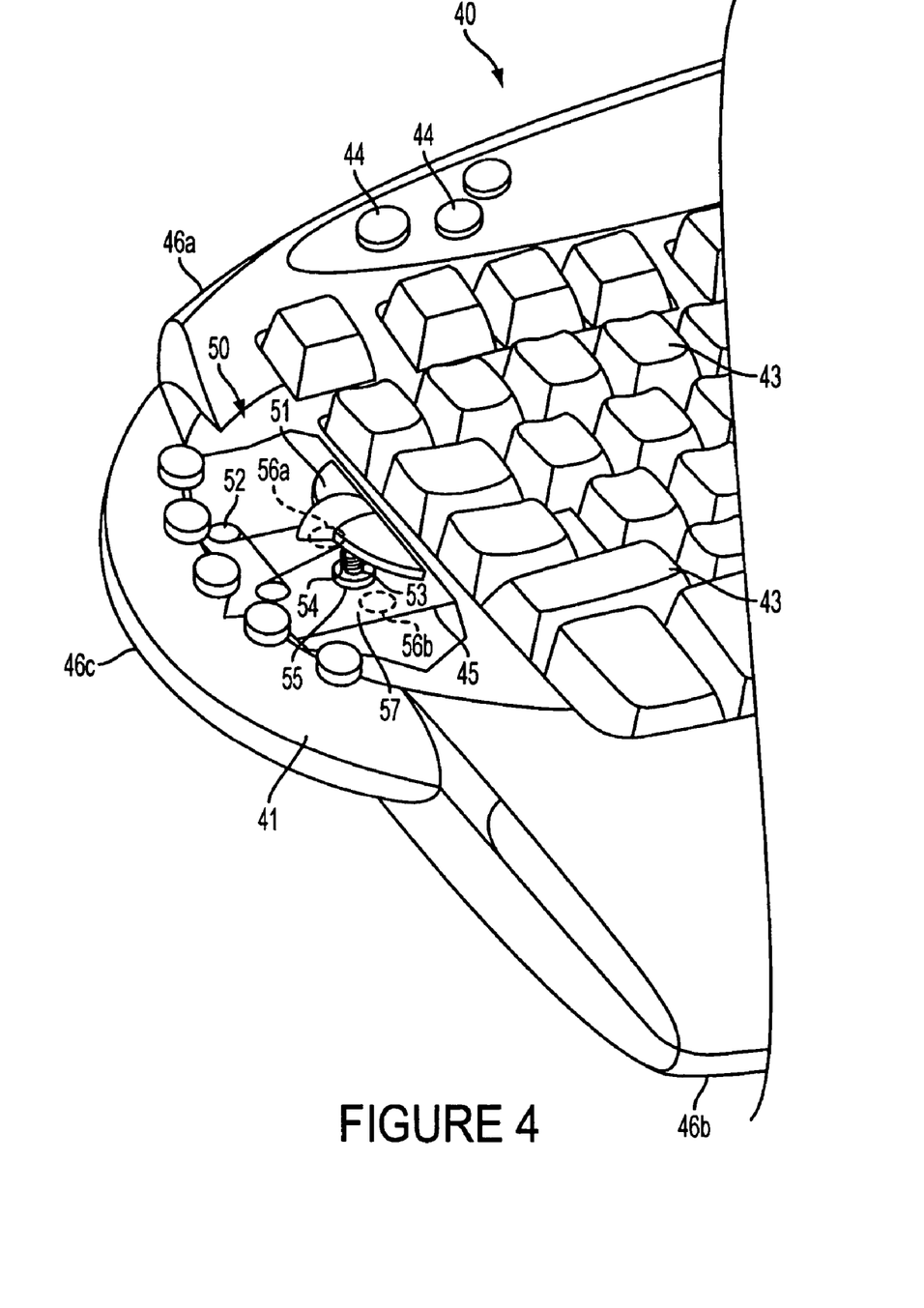
FIG. 4 is a partial, cut-away perspective view of the input device.
Figure 6:
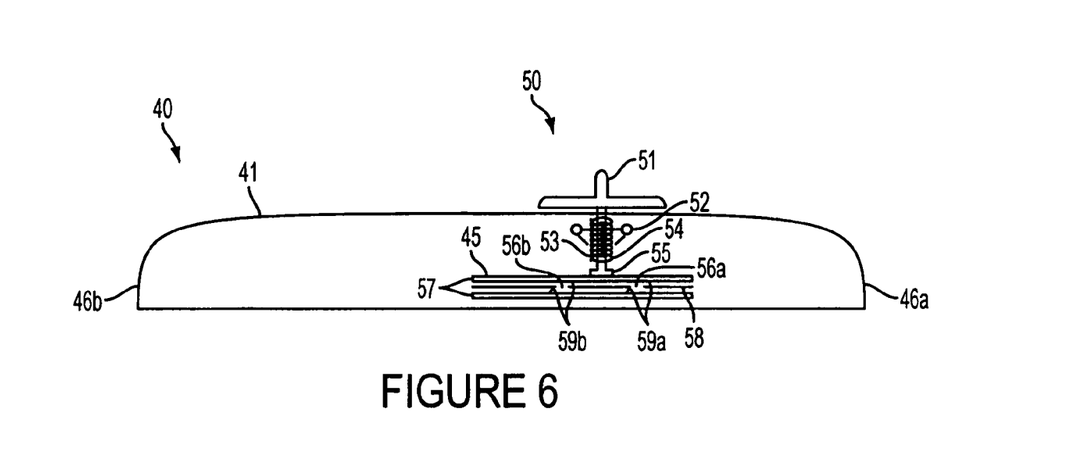
FIG. 6 is a cross-sectional view of the input device, as defined along section line 6-6 in FIG. 5.

With reference to FIGS. 4 and 6, the structure of the zoom apparatus 50 will be discussed in greater detail. The primary elements of the zoom apparatus 50 include an actuator 51, a post 52, an end portion 53, a compression spring 54, and a torsional spring 55. In addition, the zoom apparatus 50 includes a portion of the membrane sensor system 45. As will be apparent from the discussion below, the actuator 51 forms the engagement portion of the zoom apparatus 50, the membrane sensor system 45 forms the sensing arrangement of the zoom apparatus 50, and the torsional spring 55 forms the biasing system of the zoom apparatus 50. Furthermore, portions of the post 52, the end portion 53, and the compression spring 54 may also be considered to be elements of the engagement portion.

The actuator 51 (i.e., the engagement portion of zoom apparatus 50) may be a polymer element that is located on the exterior surface of housing 41 and provides an area for the individual to operate the zoom apparatus 50. As depicted in the figures, the actuator 51 has a configuration that facilitates linear sliding or otherwise translating movement of the actuator 51 in a direction toward one of the edges 46a and 46b, but may exhibit any suitable structure. The post 52 extends downward from the actuator 51, and may be formed from a separate element or of unitary (i.e., one piece) construction with the actuator 51. The end portion 53 is positioned at an end of the post 52 and opposite the actuator 51. As with the actuator 51, the post 52 and the end portion 53 may be formed from separate elements or of unitary construction. The compression spring 54 extends around the post 52, and may be formed from spring steel or other conventional spring materials. In operation, the compression spring places a downward force upon one or both of the post 52 and the end portion 53 to ensure that the end portion 53 contacts the membrane sensor system 45. In addition, compression spring limits upward the movement of the actuator 51.

The torsional spring 55 (i.e., the biasing system of the zoom apparatus 50) has a configuration that provides a relatively small degree of resistance to movement of the actuator 51, and the torsional spring 55 returns the actuator 51 to a central position when the actuator 51 is released. As depicted in the figures, the torsional spring 55 has a configuration that includes three generally linear wire segments and two coiled portions. The coiled portions permit a limited degree of movement in the relative positions of the wire segments, thereby permitting the actuator 51 to move relative to the housing 41. The torsional spring may be secured to the housing 41 or another portion of the input device 40 by posts that extend through the coiled portions or a fastener that joins with one of the wire segments, for example. The torsional spring 55 may be formed from spring steel or other conventional spring materials.

In operation, the individual contacts the actuator 51 and linearly-moves the actuator 51 toward one of the rear edge 46a and the front edge 46b to respectively zoom in or zoom out, for example. When the actuator 51 is moved toward the rear edge 46a or the front edge 46b, the end portion 53 presses downward upon specific locations in membrane sensor system 45 (i.e., the sensing arrangement of zoom apparatus 50) and closes a contact that is coupled to an interface, which may include driving circuitry or software, that is utilized to provide communication between the zoom apparatus 50 and the host computer 20. Some or all of the interfaces and drivers, if any, may be located wherever is convenient, such as all within the input device 40, all within the host computer 20, or distributed between the two. Accordingly, moving the actuator 51 toward the rear edge 46a closes a contact in the membrane sensor system 45 and induces the image 32 to zoom in on the display screen 31. Similarly, moving the actuator 51 toward the front edge 46b closes another contact in the membrane sensor system 45 and induces the image 32 to zoom out on the display screen 31.

When the actuator 51 is moved in a linear manner toward the rear edge 46a, the end portion 53 presses downward upon one of a pair of sensing regions 56a or 56b of the sensing arrangement. More particularly, the end portion 53 depresses the sensing region 56a in the membrane sensor system 45 when the actuator 51 is moved toward rear edge 46a. Similarly, the end portion 53 presses downward upon and depresses the sensing region 56b in the membrane sensor system 45 when the actuator 51 is moved toward the front edge 46*b*. The membrane sensor system 45 includes a pair of spaced outer layers 57 and an intermediate insulating layer 58 located therebetween. The intermediate insulating layer 58 defines apertures that correspond in location with each of the sensing regions 56*a* and 56*b*. Opposing portions of a pair of contacts 59*a* and 59*b* are secured to each of the outer layers 57 in the apertures. When the actuator 51 is moved toward the rear edge 46*a*, the end portion 53 engages the sensing region 56*a* and induces the one of the outer layers 57 to deflect into one of the apertures formed by the insulating layer 58. The deflection of the outer layer 57 also causes the contacts 59*a* to engage each other. The contacts 59*a* are coupled to one or more interfaces that provide communication between the zoom apparatus 50 and the host computer 20. Accordingly, moving the actuator 51 toward the rear edge 46*a* induces the zoom apparatus 50 to effectively transmit a signal to the host computer 20 that induces zooming in of the image 32. Zooming out may be effectuated in a similar fashion by moving the actuator 51 toward the front edge 46*b* and closing the contacts 59*b*. Once zooming in or zooming out is complete, the individual releases the actuator 51 and torsional spring returns the actuator 51 and other elements of the zoom apparatus 50 to a central location (i.e., a neutral position) between the contacts 59*a* and 59*b*. In some embodiments of the invention, protrusions may be formed in one of the outer layers 57 in locations that correspond with the sensing regions 56*a* and 56*b*, with the protrusions depressing into the apertures and closing the contacts 59*a* and 59*b*.

The degree to which the actuator 51 moves or otherwise translates toward the edges 46*a* and 46*b* from the neutral position between the contacts 59*a* and 59*b* at least partially depends upon the size of an opening in the housing 41 through which the post 52 protrudes and the separation distance between the contacts 59*a* and 59*b*. A suitable degree of movement for the actuator 51 is five millimeters, but may range from one millimeter to thirty millimeters, for example. Although the actuator 51 may be capable of translating 5 millimeters, for example, the zoom apparatus 50 may be configured such that one of the contacts 59*a* and 59*b* is activated prior to full movement of the actuator 51. For example, if the actuator 51 is be capable of translating 5 millimeters, then one of the contacts 59*a* and 59*b* may be activated following movement in a range of three to four millimeters. The actuator 51 is discussed above as translating in a linear manner toward either the rear edge 46*a* or the forward edge 46*b*. In further embodiments of the invention, the actuator 51 may be a rotatable device, for example.

A further consideration with regard to the zoom apparatus 50 relates to the degree of zooming that occurs upon movement of the actuator 51. Closing the contact 59*a*, for example, may induce an increase of ten percent in the relative size of the image 32. In other embodiments, however, the percentage increase in the relative size of the image 32 may vary significantly, and may be anywhere between one and one-thousand percent. The percentage increase may also be set by the individual through a software interface, or may vary depending upon the software application.

As discussed in detail above, moving or otherwise translating the actuator 51 induces the image 32 to either zoom in or zoom out on the display screen 31. Various options arise, however, when the actuator 51 is held in a position that continuously depresses one of the contacts 59*a* and 59*b*. For example, holding actuator in a position that depresses the contact 59*a* may induce the image 32 to zoom in once at a predetermined percentage. Alternately, holding the actuator 51 in a position that depresses the contact 59*a* may induce the image 32 to zoom in once at a predetermined percentage and then zoom in again after a predetermined time interval. That is, the image 32 may zoom in at ten percent, for example, when the contact 59*a* is depressed, and then the image 32 may repetitively zoom in again at ten percent following a 200 millisecond pause until the actuator 51 returns to the neutral position between the contacts 59*a* and 59*b*. In further embodiments, the zoom percentage may increase with each successive interval. In addition, the time interval between successive zooms may decrease as the actuator 51 is held in a position that activates one of the contacts 59*a* and 59*b*. Accordingly, moving the actuator 51 and holding the position of the actuator 51 may cause the image 32 to zoom once or repetitively.

An advantage of the zoom apparatus 50 discussed above relates to the efficiency of utilizing the membrane sensor system 45 to sense actuations of the keys 43, the buttons 45, and the actuator 51. In effect, the membrane sensor system 45 converts the mechanical motion of each of the keys 43, the buttons 44, and the actuator 51 to a signal that is transmitted to the host computer 20. By utilizing the same sensing component as the keys 43 and the buttons 44 (i.e., membrane sensor system 45), the overall manufacturing cost of the input device 40 may be minimized. That is, the zoom apparatus 50 may utilize the same sensing arrangement (i.e., membrane sensor system 45) as the keys 43 and the buttons 44.

Figure 7:
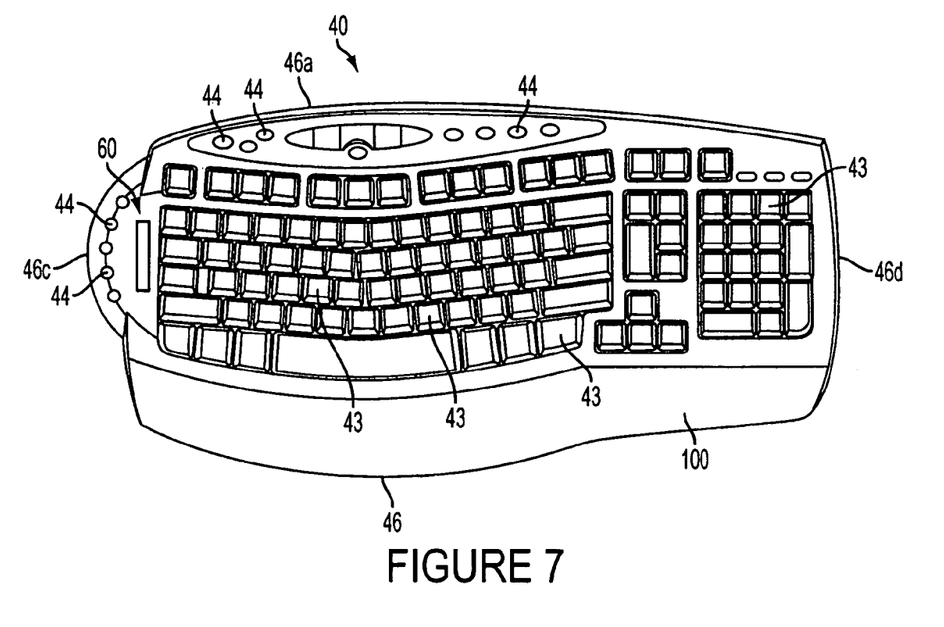
FIG. 7 is a top plan view of an input device according to another embodiment of the invention.

Another embodiment of the present invention is depicted in FIG. 7, wherein the zoom apparatus 50 is replaced by a zoom apparatus 60 having the configuration of a position-sensing touchpad. The zoom apparatus 60 exhibits an elongated structure that is oriented to extend in a direction between the edges 46*a* and 46*b*. In this arrangement, changes in the relative size of the image 32 occur when a pointer, such as a finger or stylus, is placed near or in contact with the zoom apparatus 60. More particularly, contacting an area of the zoom apparatus 60 that is closer to the rear edge 46*a* may cause the image 32 to zoom in, and contacting an area of the zoom apparatus 60 that is closer to the forward edge 46*b* may cause the image 32 to zoom out. The degree to which the image 32 zooms either in or out may be dependent upon the location that the pointer contacts the zoom apparatus 60. For example, contacting an end of the zoom apparatus 60 may induce a greater degree of zooming than contacting an area near a center of the zoom apparatus 60.

Whereas the zoom apparatus 50 includes an engagement portion (i.e., at least the actuator 51) that operates in conjunction with a sensing arrangement (i.e., the membrane sensor system 45) and a biasing system (i.e., the torsional spring 55), the zoom apparatus 60 effectively only includes the engagement portion and the sensing arrangement, which are cooperatively formed from the position-sensing touchpad. In some embodiments, however, the biasing system may be effectuated through software, for example. This configuration for the zoom apparatus 60 includes, therefore, a lesser number of components and may be more efficient to manufacture.

The zoom apparatus 60 may detect the position of the pointer along the length of the sensor 50 in any of a variety of ways. For example, the zoom apparatus 60 may be a well-known capacitance-type sensor that senses changes in capacitance between two or more conductive nodes within the zoom apparatus 60. The conductive nodes do not electrically touch but generate a capacitance in the dielectric junction between the nodes. When a pointer, such as a human finger or stylus, approaches the junction, the capacitance may be altered due to the change in dielectric constant imposed by the pointer. Such the zoom apparatus 60 has the advantages of being able to sense not only touch but also proximity and pressure. The conductive nodes may be of any shape and size, such as wires and/or plates. Depending upon the specific embodiment, such a capacitive touch strip may detect pointer location with an accuracy of up to 0.001 inch or more. However, touch sensors with less precision can be effectively used.

The zoom apparatus 60 may alternatively be a resistance-type touch strip that detects variations in resistance based on the position of the pointer along the touch strip. Or, the zoom apparatus 60 may be an inductance-type touch strip that detects variations in inductance based on the position of the pointer along the touch strip. The zoom apparatus 60 may further incorporate infrared-sensing, laser, and/or ultrasonic technology that senses the position of the pointer.

Figure 8:
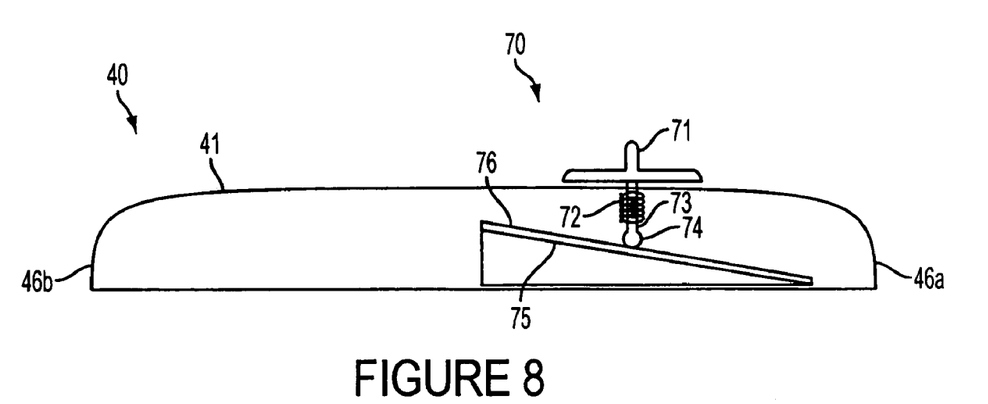
FIG. 8 is a cross-sectional view of an input device according to another embodiment of the invention.

Another embodiment of the invention is depicted in FIG. 8 as a zoom apparatus 70 that includes an actuator 71 (i.e., the engagement portion), a spring 72, a post 73, an end portion 74, an inclined plane 75, and a force-sensitive material 76 (i.e., the sensing arrangement). The actuator 71 is located on an exterior surface of the housing 41 and provides an area for the individual to operate the zoom apparatus 70. The spring 72 has a generally conventional configuration that extends around the post 73. The post 73 exhibits a variable length and extends downward from the actuator 71. The end portion 74 is positioned at an end of the post 73 and opposite the actuator 71. The zoom apparatus 70 may also incorporate a biasing system that is substantially similar to the torsional spring 55.

In operation, the individual contacts the actuator 71 and moves the actuator 71 toward one of the rear edge 46a and the front edge 46b to respectively zoom in or zoom out, for example. When the actuator 71 is moved toward the rear edge 46a or the front edge 46b, the post 73 changes in length due to the action of the spring 72, and the end portion 74 presses downward upon the force-sensitive material 76. The degree of downward force exerted by the end portion 74 at least partially depends upon the degree of compression in the spring 72. That is, when the spring 72 is compressed to a greater degree (i.e., when the actuator 71 is close to a high point of the inclined plane 75) then the downward force upon the force-sensitive material 76 is relatively high. When the spring 72 is compressed to a lesser degree (i.e., when the actuator 71 is close to a low point of the inclined plane 75), however, then the downward force upon the force-sensitive material 76 is relatively low. Accordingly, an interface, which may include driving circuitry or software, that is utilized to provide communication between the zoom apparatus 70 and the host computer 20 may sense the position of the actuator 71 and induce zooming of the image 32 based upon the position of the actuator 71.

The force-sensitive material 76 may be formed from an insulative sheet of polyethylene mixed with conductive particles, such as carbon. The conductive particles are homogenously dispersed in the insulator, and the net resistance of the force-sensitive material is dependent upon the volume fraction of the particles in ratio to the volume fraction of the insulator. Compressing the force-sensitive material 76 effectively changes this ratio in proportion to the compressive force. A suitable force sensitivity for the force-sensitive material 76 is twenty grams to one-thousand grams, with a suitable resistance range being ten-thousand ohms to one-million ohms. As noted above, an interface that is utilized to provide communication between the zoom apparatus 70 and the host computer 20 may sense the position of the actuator 71 and induce zooming of the image 32 based upon the position of the actuator 71. The position of the actuator 71 may be determined based upon the resistance of the force-sensitive material 76.

Figure 9:
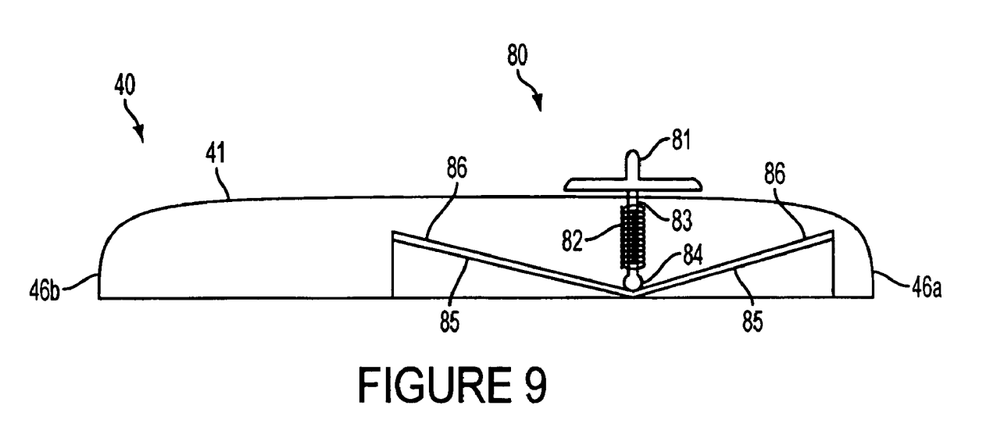
FIG. 9 is a cross-sectional view of an input device according to another embodiment of the invention.

A similar embodiment is depicted in FIG. 9, as the zoom apparatus 80 that includes an actuator 81 (i.e., the engagement portion), a spring 82, a post 83, an end portion 84, a pair of inclined planes 85, and a force-sensitive material 86 (i.e., the sensing arrangement). The actuator 81 is located on an exterior surface of the housing 41 and provides an area for the individual to operate the zoom apparatus 80. The spring 82 has a generally conventional configuration that extends around the post 83. The post 83 exhibits a variable length and extends downward from the actuator 81. The end portion 84 is positioned at an end of the post 83 and opposite the actuator 81. In contrast with the zoom apparatus 70, the inclined planes 85 form a v-shaped structure.

In operation, the individual contacts the actuator 81 and moves the actuator 81 toward one of the rear edge 46a and the front edge 46b to respectively zoom in or zoom out, for example. When the actuator 81 is moved toward the rear edge 46a or the front edge 46b, the post 83 changes in length due to the action of the spring 82, and the end portion 84 presses downward upon the force-sensitive material 86, thereby inducing zooming of the image 32 based upon the degree of downward force exerted by the end portion 84. When the actuator 81 is released by the individual, the force of the spring 82 induces the actuator 81, the spring 82, the post 83, and the end portion 84 to move to a central area (i.e., the low point) of the v-shaped structure formed by the inclined planes 85, thereby forming the biasing system of the zoom apparatus 80.

Figure 10:
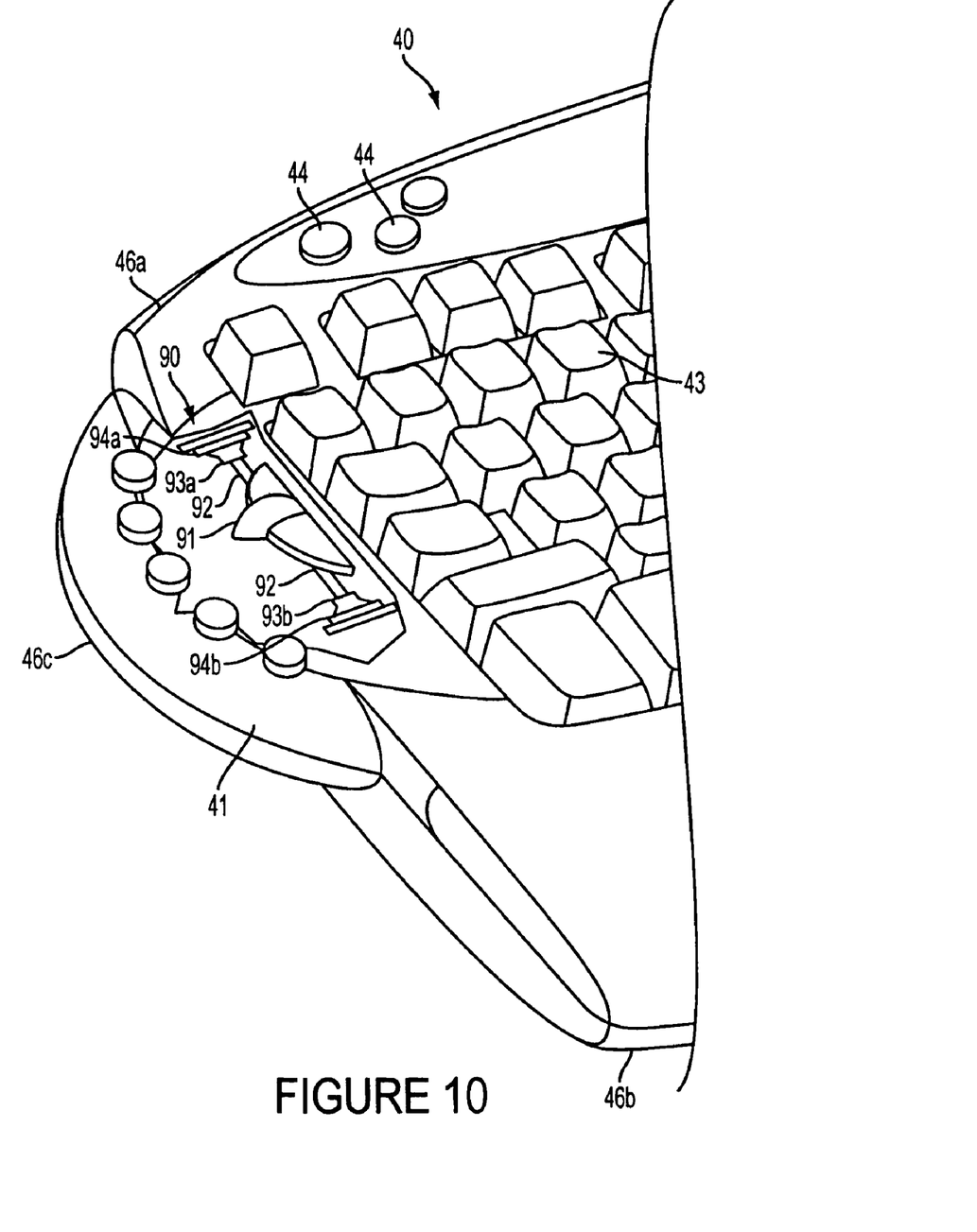
FIG. 10 is a partial, cut-away perspective view of an input device according to another embodiment of the invention.

A further embodiment of the invention is depicted in FIG. 10 as including a zoom apparatus 90 with an actuator 91, a plunger 92, a pair of domes 93a and 93b, and a pair of force-sensitive film elements 94a and 94b. In operation, the individual contacts the actuator 91 and moves the actuator 91 toward one of the domes 93a and 93b to respectively zoom in or zoom out, for example. When the actuator 91 is moved toward the rear edge 46a or front edge 46b, the plunger 92 impacts and compresses one of domes 93a and 93b, thereby pressing upon one of the associated force-sensitive material elements 94a and 94b. When the force-sensitive film element 94a is compressed, the image 32 may zoom in, whereas the image 32 may zoom out when the force-sensitive film element 94b is compressed. The force-sensitive film elements 94a and 94b may be formed from a material that is similar to the material utilized for the force-sensitive material 76. As an alternative to the force-sensitive material 76, a conventional tactile switch or a membrane sensor system similar to the membrane sensor system 45 may be incorporated into the structure.

Based upon the above discussion, the invention includes a variety of exemplary zoom apparatuses 50, 60, 70, 80, and 90 that may be utilized by an individual to selectively change the scale (i.e., relative size) at which viewable contents of a computer file are rendered on the display screen 31 as the image 32. Accordingly, the zoom apparatuses 50, 60, 70, and 80 permit the individual to zoom in or zoom out on the viewable contents of the computer file in order to increase or decrease the relative size of the rendered the image 32. Although each of the zoom apparatuses 50, 60, 70, 80, and 90 are discussed and depicted in combination with a keyboard, concepts related to the present invention also have application to other devices. In addition to the input device 40, therefore, the zoom apparatuses 50, 60, 70, 80, and 90 may also be incorporated into other types of input devices, including a mouse-style pointing device or a trackball pointing device, for example. Within the scope of the present invention, the zoom apparatuses 50, 60, 70, 80, and 90 may also be incorporated into a plurality of other computer-related input devices, such as the bezel of a personal data assistant or handheld computing device, a wireless telephone, a web pad or other internet appliance, a gaming controller, or a chassis of a notebook computer, for example. The manner in which the zoom apparatuses 50, 60, 70, 80, and 90 may be incorporated into a computer operating environment is not limited, therefore, to the precise example embodied by the input device 40 in the drawings, but may be incorporated into a variety of components to provide the zooming functions discussed herein.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An input device comprising:
   a keyboard; and
   a zoom apparatus embedded on the keyboard, wherein the primary purpose of the zoom apparatus is to zoom an image rendered on a display screen, the zoom apparatus including:
   an actuator that translates in a first direction to induce the image to zoom in, and the actuator being translatable in a second direction to induce the image to zoom out, and
   a sensing arrangement including a pair of outer layers, an insulating layer positioned between the outer layers that defines a first aperture and a second aperture, a first contact positioned adjacent the first aperture, and a second contact positioned adjacent the second aperture for detecting movement of the actuator in the first direction and movement of the actuator in the second direction,
   wherein the insulating layer is formed from an insulative sheet of polyethylene mixed with conductive particles, and
   wherein the conductive particles are homogenously dispersed in the insulating layer and the net resistance of the sensing arrangement is functionally related to a volume fraction of the particles in ratio to a volume fraction of the insulating layer.

2. The input device recited in claim 1, further including a sensing arrangement for detecting movement of the actuator in the first direction and movement of the actuator in the second direction.

3. The input device recited in claim 2, wherein the keyboard includes a plurality of keys for inputting alphanumeric data, the sensing arrangement also detecting actuation of the keys.

4. The input device recited in claim 3, wherein the zoom apparatus is positioned adjacent one of a left edge and a right edge of the keyboard.

5. The input device recited in claim 1, wherein moving the actuator in the first direction closes the first contact, and moving the actuator in the second direction closes the second contact.

6. The input device recited in claim 1, wherein the actuator translates linearly in the first direction and the second direction.

7. The input device recited in claim 1, wherein the first direction and the second direction correspond with a direction between a rear edge and a forward edge of the input device.

8. The input device recited in claim 1, wherein the zoom apparatus includes a biasing system for returning the actuator to a central position.

9. The input device recited in claim 8, wherein the biasing system includes a torsional spring.

10. An input device comprising:
    a keyboard; and
    a zoom apparatus embedded on the keyboard, wherein the primary purpose of the zooming apparatus is to zoom an image rendered on a display screen, the zoom apparatus being dedicated to transmitting:
    a first signal having first data that induces the image to zoom in; and
    a second signal having second data that induces the image to zoom out,
    wherein the zoom apparatus includes a sensing arrangement including a pair of outer layers, an insulating layer positioned between the outer layers, wherein the sensing arrangement is activatable in a first position to transmit the first signal, and the sensing arrangement is activatable in a second position to transmit the second signal,
    wherein the insulating layer is formed from an insulative sheet of polyethylene mixed with conductive particles, and
    wherein the conductive particles are homogenously dispersed in the insulating layer and the net resistance of the sensing arrangement is functionally related to a volume fraction of the particles in ratio to a volume fraction of the insulating layer.

11. The input device recited in claim 10, wherein the sensing arrangement is a membrane sensor system having a first contact in the first position and a second contact in the second position.

12. The input device recited in claim 10, wherein the keyboard includes a plurality of keys for inputting alphanumeric data, the sensing arrangement also detecting actuation of the keys.

13. The input device recited in claim 12, wherein the first position and the second position correspond with a direction between a rear edge and a forward edge of the keyboard.

14. The input device recited in claim 10, wherein the zoom apparatus includes an actuator that translates to the first position and the second position.

15. The input device recited in claim 5, wherein the zoom apparatus includes a biasing system for returning the actuator to a central position between the first position and the second position.

16. The input device recited in claim 15, wherein the biasing system includes a torsional spring.

17. An input device comprising:
    a keyboard including a plurality of keys for inputting alphanumeric data;
    a zoom apparatus embedded on the keyboard, wherein the primary purpose of the zoom apparatus is to zoom an image rendered on a display screen,
    the zoom apparatus including an actuator that is movable in a first direction to induce the image to zoom in, and the actuator being movable in a second direction to induce the image to zoom out; and a sensing arrangement for detecting movement of the actuator in the first direction and movement of the actuator in the second direction, the sensing arrangement also detecting actuation of the keys, the sensing arrangement being a membrane sensor system including a pair of outer layers, an insulating layer positioned between the outer layers that defines a first aperture and a second aperture, a first contact positioned adjacent the first aperture, and a second contact positioned adjacent the second aperture, wherein the insulating layer is formed from an insulative sheet of polyethylene mixed with conductive particles, and wherein the conductive particles are homogenously dispersed in the insulating layer and the net resistance of the sensing arrangement is functionally related to a volume fraction of the particles in ratio to a volume fraction of the insulating layer.

18. The input device recited in claim 17, wherein moving the actuator in the first direction closes the first contact, and moving the actuator in the second direction closes the second contact.

19. The input device recited in claim 17, wherein the zoom apparatus is positioned adjacent one of a left edge and a right edge of the keyboard.

20. The input device recited in claim 17, wherein the first direction and the second direction correspond with a direction between a rear edge and a forward edge of the input device.

21. The input device recited in claim 17, wherein the actuator translates linearly to move in the first direction and the second direction.

22. The input device recited in claim 17, wherein the zoom apparatus includes a biasing system for returning the actuator to a central position.

23. A method of zooming an image rendered on a display screen, the method comprising steps of:

providing an input device comprising a keyboard and a zoom apparatus embedded on the keyboard, wherein the zoom apparatus includes a movable actuator and wherein the primary purpose of the zoom apparatus is to zoom the image rendered on the display screen, providing a sensing arrangement including a pair of outer layers, an insulating layer positioned between the outer layers that defines a first aperture and a second aperture, a first contact positioned adjacent the first aperture, and a second contact positioned adjacent the second aperture, wherein the insulating layer is formed from an insulative sheet of polyethylene mixed with conductive particles, and wherein the conductive particles are homogenously dispersed in the insulating layer and the net resistance of the sensing arrangement is functionally related to a volume fraction of the particles in ratio to a volume fraction of the insulating layer;

moving the actuator in a first position to close the first contact, and moving the actuator in a second position to close the second contact;

detecting movement of the actuator to the first position;

transmitting a first signal to a host computer that is operatively connected to the display screen to induce the image to zoom in;

detecting movement of the actuator to the second position; and transmitting a second signal to the host computer to induce the image to zoom out.

\* \* \* \* \*